United States Patent
Liu

(10) Patent No.: US 8,641,013 B2
(45) Date of Patent: Feb. 4, 2014

(54) QUICK RELEASE CONNECTOR WITH A RING ANTI-DROP COVER

(76) Inventor: Hsiu-Hsiung Liu, New Taipei (TW)

( * ) Notice: Subject to any disclaimer, the term of this patent is extended or adjusted under 35 U.S.C. 154(b) by 50 days.

(21) Appl. No.: 13/490,533

(22) Filed: Jun. 7, 2012

(65) Prior Publication Data
US 2013/0327420 A1    Dec. 12, 2013

(51) Int. Cl.
*F16L 37/28*    (2006.01)
(52) U.S. Cl.
USPC .................................. 251/149.9; 251/149.6
(58) Field of Classification Search
USPC ............. 251/149, 149.1, 149.6, 149.7, 149.8, 251/149.9; 137/614.06; 277/438; 285/277, 285/276
See application file for complete search history.

(56) References Cited

U.S. PATENT DOCUMENTS

| | | | | |
|---|---|---|---|---|
| 2,850,297 | A * | 9/1958 | Clark | 251/149.6 |
| 5,423,515 | A * | 6/1995 | Ozaki | 251/149.6 |
| 5,445,358 | A * | 8/1995 | Anderson | 251/149.6 |
| 5,607,139 | A * | 3/1997 | Kjellberg | 251/149.6 |
| 6,279,874 | B1 * | 8/2001 | Nyberg | 251/149.6 |
| 6,886,804 | B2 * | 5/2005 | Doi et al. | 251/149.6 |
| 6,923,428 | B2 * | 8/2005 | Quere et al. | 251/149.6 |
| 7,673,911 | B2 * | 3/2010 | Liu | 285/276 |
| 7,926,783 | B1 * | 4/2011 | Liu | 251/149.9 |
| 8,191,932 | B2 * | 6/2012 | Davis | 137/614.05 |
| 8,303,000 | B2 * | 11/2012 | Liu | 285/277 |
| 8,356,794 | B1 * | 1/2013 | Liu | 251/149.9 |

* cited by examiner

*Primary Examiner* — John K Fristoe, Jr.
*Assistant Examiner* — Andrew J Rost
(74) *Attorney, Agent, or Firm* — Alan Kamrath; Kamrath IP Lawfirm, P.A.

(57) ABSTRACT

A quick release connector has a body, a positioning mount, a sealing valve and an outer sleeve. The body has a connecting end, a linking end and an air inlet chamber. The positioning mount is detachably connected to the body and has a fixing end, an inserting end, an air outlet chamber, multiple ball holes, a returning spring, at least one sealing element and multiple balls. The sealing valve is movably mounted in the body and the positioning mount, selectively abuts the at least one sealing element and has a closed end, an open end, a mounting post, at least one air inlet, a sealing ring and a ring anti-drop cover. The outer sleeve is slidably mounted around the body and the positioning mount and has a spring recess, a holding recess and a pressing spring.

12 Claims, 6 Drawing Sheets

QUICK RELEASE CONNECTOR WITH A RING ANTI-DROP COVER

BACKGROUND OF THE INVENTION

1. Field of the Invention

The present invention relates to a quick release connector, and more particularly to a quick release connector with a ring anti-drop cover to prevent a sealing ring separating from the quick release connector, to provide a preferred sealing effect and to reduce the manufacturing cost for the quick release connector.

2. Description of Related Art

A conventional quick release connector is used in pipe connections and comprises a body, a sealing valve and an outer sleeve. The body may be composed of multiple tubes and has a connecting end and a holding end. The connecting end of the body is connected to an air compressor. The sealing valve is movably mounted in the body between the ends of the body and has a closed end, an open end, at least one air inlet and a sealing ring. The closed end of the sealing valve is enlarged and is mounted in the body near the connecting end of the body. The open end of the sealing valve is mounted in the body near the holding end of the body and is connected to a plug. The at least one air inlet is formed radially through an external surface of the sealing valve near the closed end. The sealing ring is mounted around the closed end of the sealing valve and selectively abuts an internal segment of the body to provide a sealing effect to the body and to enable the connecting end of the body to discommunicate from the holding end of the body. The outer sleeve is slidably mounted around the body to enable the plug to connect with the open end of the sealing valve so as to transport high-pressured air from the air compressor to the plug.

The conventional quick release connector can provide a quick connecting effect between the air compressor and the plug. However, when the conventional quick release is connected between an air compressor and a plug, the closed end of the sealing valve is pushed toward the connecting end of the body to enable the body to communicate with the plug via the at least one air inlet. When the flow rate of the high-pressured air is beyond the limit of the conventional quick release connector, the sealing ring that is mounted around the closed end of the sealing valve may be blown to separate from the closed end of the sealing valve by the high-pressured air.

Then, the sealing valve cannot provide a secured sealing effect to the conventional quick release connector when the plug is separated from the conventional quick release connector, and a user needs to disassemble the conventional quick release connector to maintain the conventional quick release connector. However, the user may instead discard the conventional quick release connector when taking account of the cost and time of maintenance, and this will cause the waste of resources and costs.

The quick release connector with a ring anti-drop cover in accordance with the present invention mitigates or obviates the aforementioned problems.

SUMMARY OF THE INVENTION

The main objective of the invention is to provide a quick release connector with a ring anti-drop cover that can prevent a sealing ring separating from the quick release connector, can provide a preferred sealing effect and can reduce the cost of manufacturing the quick release connector.

The quick release connector in accordance with the present invention has a body, a positioning mount, a sealing valve and an outer sleeve. The body has a connecting end, a linking end and an air inlet chamber. The positioning mount is detachably connected to the body and has a fixing end, an inserting end, an air outlet chamber, multiple ball holes, a returning spring, at least one sealing element and multiple balls. The sealing valve is movably mounted in the body and the positioning mount, selectively abuts the at least one sealing element and has a closed end, an open end, a mounting post, at least one air inlet, a sealing ring and a ring anti-drop cover. The outer sleeve is slidably mounted around the body and the positioning mount and has a spring recess, a holding recess and a pressing spring.

Other objects, advantages and novel features of the invention will become more apparent from the following detailed description when taken in conjunction with the accompanying drawings.

DETAILED DESCRIPTION OF PREFERRED EMBODIMENT

Figure 1:
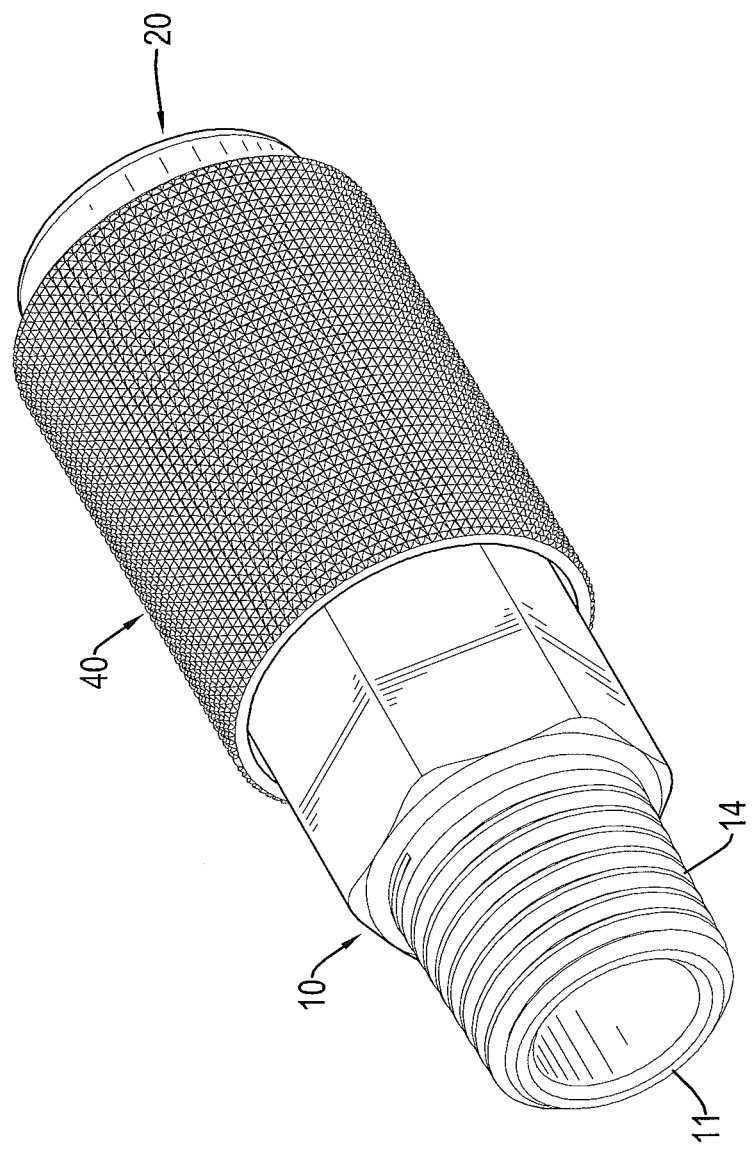
FIG. 1 is a perspective view of a quick release connector with a ring anti-drop cover in accordance with the present invention.
Figure 2:
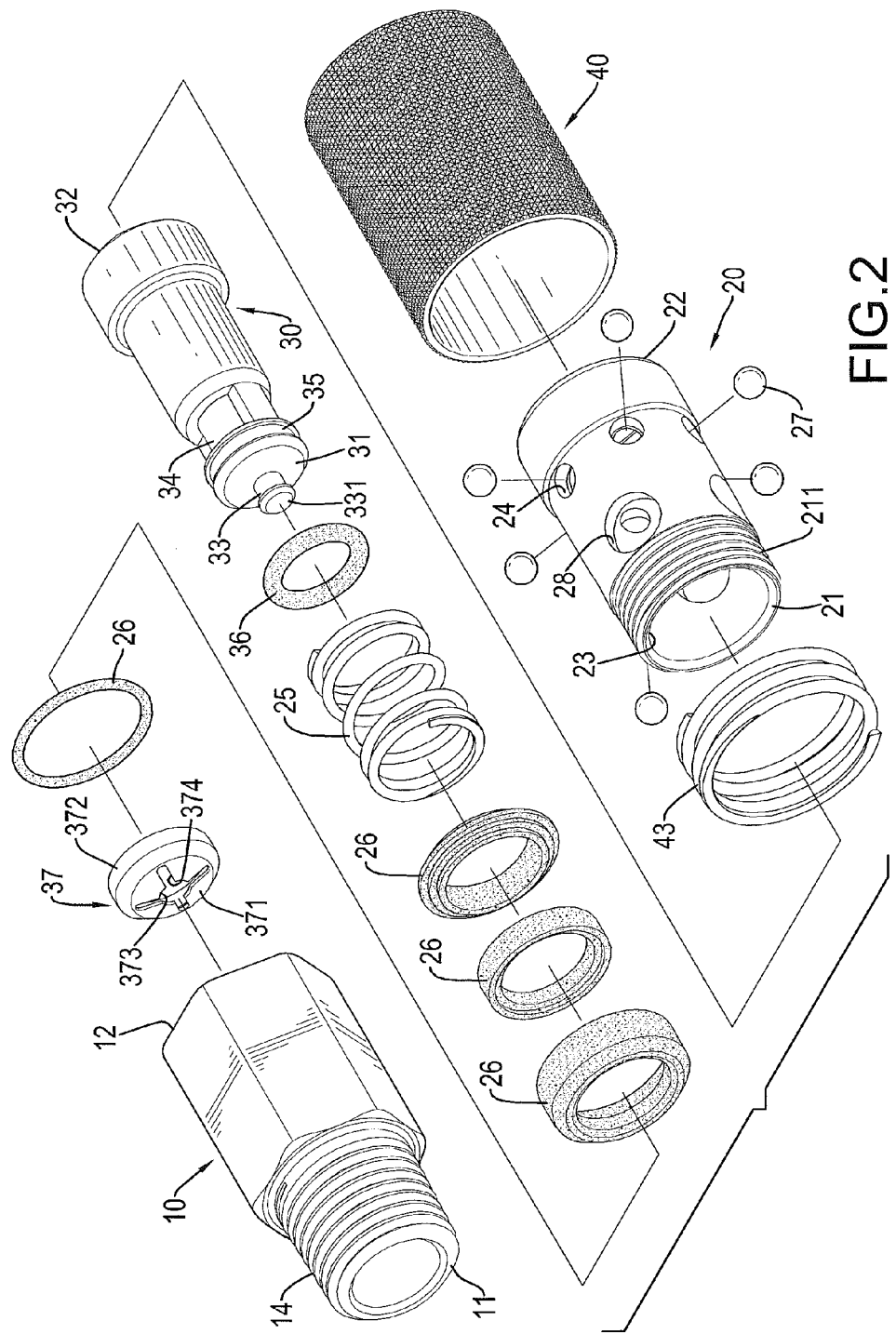
FIG. 2 is an exploded perspective view of the quick release connector with a ring anti-drop cover in FIG. 1.
Figure 3:
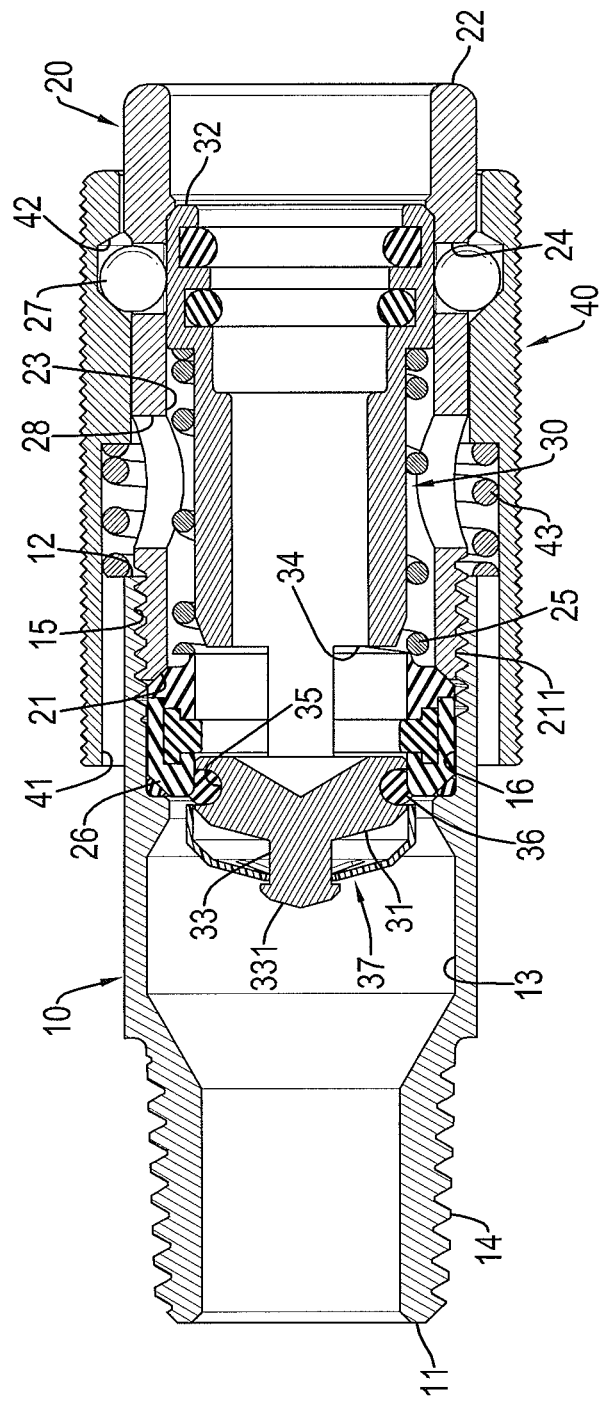
FIG. 3 is a side view in partial section of the quick release connector with a ring anti-drop cover in FIG. 1.

With reference to FIGS. 1 to 3, a quick release connector with a ring anti-drop cover in accordance with the present invention comprises a body 10, a positioning mount 20, a sealing valve 30 and an outer sleeve 40.

The body 10 is hollow and has an external surface, an internal surface, a connecting end 11, a linking end 12, an air inlet chamber 13, an outer thread 14, an inner thread 15 and a holding recess 16. The connecting end 11 of the body 10 is connected to an air compressor. The linking end 12 of the body 10 is formed with the connecting end 11 and is connected to a plug. The air inlet chamber 13 is formed in the body 10 between the ends 11, 12 of the body 10. The outer thread 14 is formed on the external surface of the body 10 near the connecting end 11. The inner thread 15 is formed on the internal surface of the body 10 near the linking end 12. The holding recess 16 is formed in the body between the air inlet chamber 13 and the inner thread 15 of the body 10.

The positioning mount 20 is detachably connected to the body 10 and has an external surface, an internal surface, a fixing end 21, an inserting end 22, an air outlet chamber 23, multiple ball holes 24, a returning spring 25, at least one sealing element 26, multiple balls 27 and multiple releasing holes 28. The fixing end 21 of the positioning mount 20 is inserted into the connecting end 11 of the body 10 and has an outer thread 211 formed on the external surface of the positioning mount 20 near the fixing end 21 to be securely screwed with the inner thread 15 of the body 10 so as to connect the positioning mount 20 with the body 10. The inserting end 22 of the positioning mount 20 is formed with the fixing end 21 and is connected to a plug. The air outlet chamber 23 is formed in the positioning mount 20 and selectively communicates with the air inlet chamber 13 of the body 10.

The ball holes 24 are formed through the external surface of the positioning mount 20 at intervals near the inserting end 22 of the positioning mount 20 and communicate with the air outlet chamber 23. The returning spring 25 is mounted in the air outlet chamber 23 of the positioning mount 20 between the fixing end 21 and the ball holes 24 and has two ends. The at least one sealing element 26 is mounted in the holding recess 16 of the body 10 and abuts securely against the fixing end 21 of the positioning mount 20 and one of the ends of the returning spring 25 to enable the at least one sealing element 26 to be securely mounted between the body 10 and the positioning mount 20. The balls 27 are respectively held in the ball holes 24 in the positioning mount 20. The releasing holes 28 are formed through the external surface of the positioning mount 20 at intervals between the fixing end 21 and the ball holes 24 and communicate with the air outlet chamber 23.

The sealing valve 30 is movably mounted in the body 10 and the positioning mount 20, selectively abuts the at least one sealing element 26 of the positioning mount 20 and has an external surface, an internal surface, a closed end 31, an open end 32, a mounting post 33, at least one air inlet 34, a mounting recess 35, a sealing ring 36 and a ring anti-drop cover 37. The closed end 31 of the sealing valve 30 is enlarged, is mounted in the air inlet chamber 13 of the body 10 and is mounted through the at least one sealing element 26 to selectively close a passage between the air inlet chamber 13 of the body 10 and the air outlet chamber 23 of the positioning mount 20. The open end 32 of the sealing valve 30 is mounted in the air outlet chamber 23 of the positioning mount 20. The external surface of the sealing valve 30 abuts the balls 27 at the open end 32. The returning spring 25 is mounted around the sealing valve 30 and the other end of the returning spring 25 abuts the external surface of the sealing valve 30 near the open end 32.

The mounting post 33 is formed on and protrudes from the closed end 31 of the sealing valve 30 and has a diameter, a free end and a limiting board 331. The limiting board 331 is formed on the free end of the mounting post 33 opposite to the closed end 31 of the sealing valve 30 and has a diameter larger than the diameter of the mounting post 33. The at least one air inlet 34 is formed radially through the external surface of the sealing valve 30 near the closed end 31 and selectively communicates with the air inlet chamber 13 of the body 10 or the air outlet chamber 23 of the positioning mount 20.

The mounting recess 35 is formed around the external surface of the sealing valve 30 near the closed end 31. The sealing ring 36 is mounted in the mounting recess 35 and selectively abuts against the at least one sealing element 26 of the positioning mount 20 to enable the air inlet chamber 13 of the body 10 to discommunicate from the air outlet chamber 23 of the positioning mount 20. The ring anti-drop cover 37 is movably mounted around the mounting post 33 between the limiting board 331 and the closed end 31 and has a closed end 371, an open end 372, a mounting hole 373 and multiple slots 374. The closed end 371 of the ring anti-drop cover 37 faces the connecting end 11 of the body 10. The open end 372 of the ring anti-drop cover 37 is mounted around the closed end 31 of the sealing valve 30 and selectively abuts against the sealing ring 36 and the at least one sealing element 26. The mounting hole 373 is formed through the closed end 371 of the ring anti-drop cover 37 and is mounted around the mounting post 33. The slots 374 are formed through the closed end 371 of the ring anti-drop cover 37 and communicate with the mounting hole 373 to enable the ring anti-drop cover 37 to elastically deform to pass through the limiting board 331 and to be mounted around the mounting post 33 between the limiting board 331 and the closed end 31 of the sealing valve 30.

The outer sleeve 40 is slidably mounted around the body 10 and the positioning mount 20 and has a mounting end, a pushing end, an internal surface, a spring recess 41, a holding recess 42 and a pressing spring 43. The mounting end of the outer sleeve 40 is mounted around the body 10 near the linking end 12. The pushing end of the outer sleeve 40 is mounted around the positioning mount 20 near the inserting end 22. The spring recess 41 is formed in the internal surface of the outer sleeve 40 at the mounting end and is mounted around the body 10 and the positioning mount 20.

The holding recess 42 is formed in the internal surface of the outer sleeve 40 at the pushing end and holds the balls 27 of the positioning mount 20 inside to keep the outer sleeve 40 from escaping from the positioning mount 20. The pressing spring 43 is mounted around the positioning mount 20 in the spring recess 41 and abuts the linking end 12 of the body 10 to make the balls 27 held between the holding recess 42, the ball holes 24 and the external surface of the sealing valve 30 at the open end 32.

With reference to FIG. 3, when the quick release connector in accordance with the present invention is not connected to an air compressor and a plug, the sealing ring 36 of the sealing valve 30 abuts against the at least one sealing element 26 to close the passage between the air inlet chamber 13 of the body 10 and the air outlet chamber 23 of the positioning mount 20 by a force of the returning spring 25.

Figure 4:
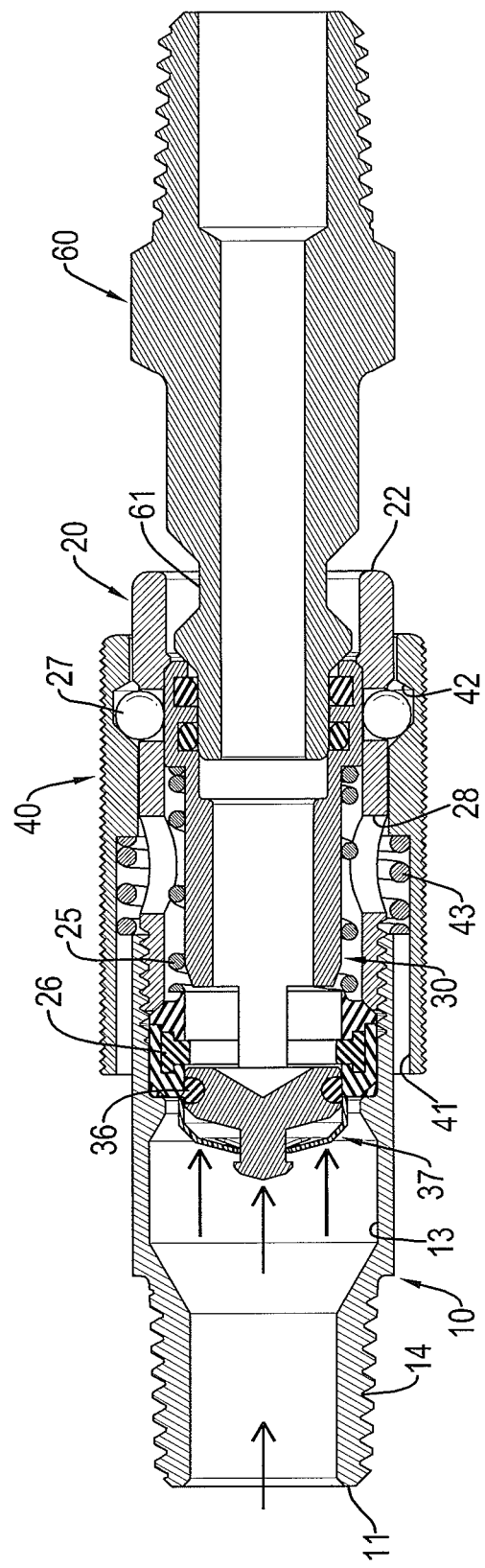
FIG. 4 is an operational side view in partial section of the quick release connector with a ring anti-drop cover in FIG. 1 showing a plug being inserted into the connector.

In addition, with reference to FIG. 4, when the connecting end 11 of the body 10 is connected to an air compressor and the quick release connector as described is not connected with a plug, the sealing ring 36 of the sealing valve 30 further abuts against the at least one sealing element 26 to close the passage between the air inlet chamber 13 of the body 10 and the air outlet chamber 23 of the positioning mount 20 by a force of the returning spring 25 and the pressure of the pressurized air. The pressurized air from the air compressor through the air inlet chamber 13 of the body 10 is blocked by the sealing ring 36 of the sealing valve 30 and at least one sealing element 26 of the positioning mount 20 and is kept from leaking. Furthermore, the pressurized air also can enable the elastic deforming ring anti-drop cover 37 to move toward the closed end 31 of the sealing valve 30 and enable the ring anti-drop cover 37 to cover around the sealing ring 36 and abut against the at least one sealing element 26. Then, the sealing ring 36 will not be separated from the sealing valve 30 by the pressurized air when the body 10 is connected to the air compressor.

Figure 5:
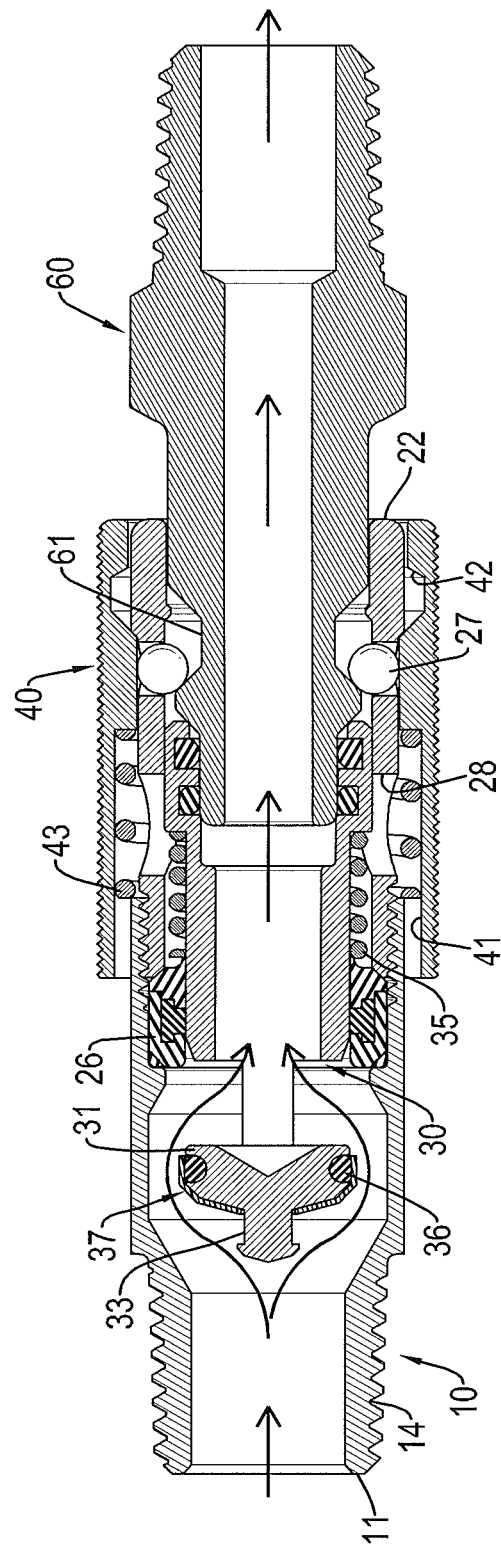
FIG. 5 is another operational side view in partial section of the quick release connector with a ring anti-drop cover in FIG. 1 showing a plug being inserted into the connector.
Figure 6A:
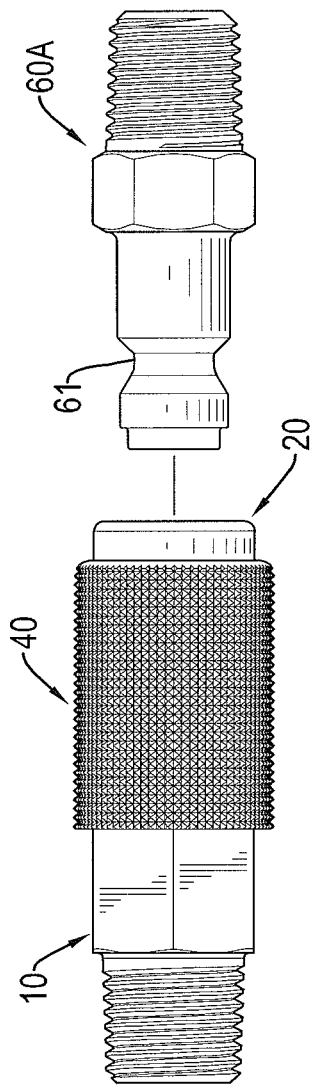
FIGS. 6A and 6B are operational side views of a quick release connector with a ring anti-drop cover in FIG. 1 showing different types of plugs being inserted into the connectors.
Figure 6B:
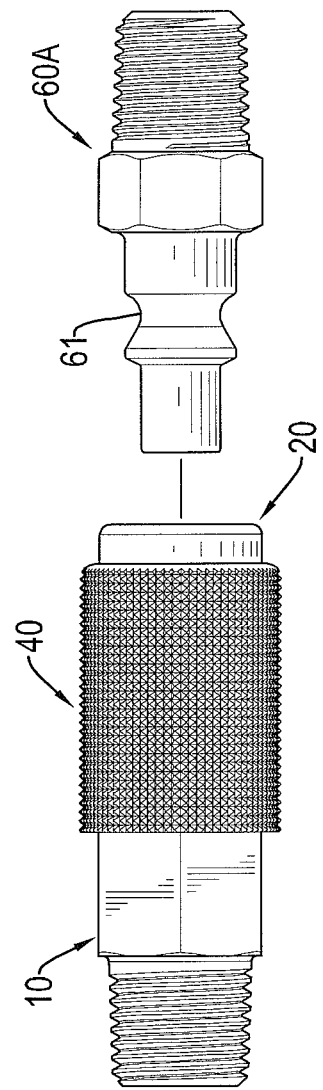

With reference to FIGS. 4 and 5, a plug 60 with an annular engaging recess 61 connected to a tool is inserted into the sealing valve 30 via the inserting end 22 of the positioning mount 20 to push the open end 32 of the sealing valve 30 to enable the sealing valve 30 to move toward the connecting end 11 of the body 10. When the annular engaging recess 61 of the plug 60 moves inward to align with the ball holes 24 of the positioning mount 20, the balls 27 will escape from the holding recess 42 of the outer sleeve 40 and move into the annular engaging recess 61 of the plug 60. When the balls 27 move into the annular engaging recess 61 of the plug 60, the pressing spring 43 will push the outer sleeve 40 to move toward the inserting end 22 of the positioning mount 20 to enable the balls 27 to engage the annular engaging recess 61 of the plug 60 firmly between the ball holes 24 and the internal surface of the outer sleeve 40. Then, the closed end 31 of the sealing valve 30 is pushed toward the connecting end 11 of the body 10 to enable the sealing ring 36 to depart away from the at least one sealing element 26 to allow the at least one air inlet 34 of the sealing valve 30 to communicate with the air inlet chamber 13 of the body 10 and this enables the pressurized air to flow into the plug 60 via the at least one air inlet 34. Thus, the pressurized air will flow into the tool that is connected with the plug 60 via the body 10, the sealing valve 30 and the plug 60. Additionally, with reference to FIGS. 6A and 6B, different kinds of plugs 60A and 60B also can be held firmly with the positioning mount 20 by the balls 27.

When the pressurized air flows into the tool that is connected with the plug 60 via the body 10, the sealing valve 30 and the plug 60, the pressurized air also blows on and pushes the ring anti-drop cover 37 to move toward the closed end 31 of the sealing valve 30 and to deform to abut the closed end 31 of the sealing valve 30. When the ring anti-drop cover 37 is deformed by the pressurized air, the ring anti-drop cover 37 is mounted and covered around the sealing ring 36 and the sealing ring 36 will not be separated from the sealing valve 30 when the pressurized air flows into the tool that is connected with the plug 60 via the body 10, the sealing valve 30 and the plug 60 as shown in FIG. 5. Then, the sealing ring 36 cannot be separated from the sealing valve 30 when the pressurized air flows into the tool even if the flow rate of the high-pressured air is beyond the limit of the quick release connector and this can reduce the cost and time of maintenance.

In addition, when the quick release connector is separated from the air compressor, the ring anti-drop cover 37 will separate from the closed end 31 of the sealing valve 30 by the elastic deformation. Furthermore, when the plug 60 is separated from the positioning mount 20 by pushing the outer sleeve 40 to enable the balls 27 to disengage from the engaging recess 61, the sealing ring 36 still abuts against the at least one sealing element 26 to provide a preferred sealing effect to the quick release connector.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A quick release connector comprising:
a body having:
an external surface;
an internal surface;
a connecting end;
a linking end formed with the connecting end; and
an air inlet chamber formed in the body between the ends of the body;
a positioning mount detachably connected to the body and having:
an external surface;
an internal surface;
a fixing end inserted into and connected to the connecting end of the body;
an inserting end formed with the fixing end;
an air outlet chamber formed in the positioning mount and selectively communicating with the air inlet chamber of the body;
multiple ball holes formed through the external surface of the positioning mount at intervals near the inserting end of the positioning mount and communicating with the air outlet chamber;
a returning spring mounted in the air outlet chamber of the positioning mount between the fixing end and the ball holes and having two ends;
at least one sealing element mounted in the body and abutting securely against the fixing end of the positioning mount and one of the ends of the returning spring to enable the at least one sealing element to be securely mounted between the body and the positioning mount; and
multiple balls respectively held in the ball holes in the positioning mount;
a sealing valve movably mounted in the body and the positioning mount, selectively abutting the at least one sealing element of the positioning mount and having:
an internal surface;
a closed end being enlarged, mounted in the air inlet chamber of the body and mounted through the at least one sealing element to selectively close a passage between the air inlet chamber of the body and the air outlet chamber of the positioning mount;
an open end mounted in the air outlet chamber of the positioning mount;
an external surface abutting the balls at the open end of the sealing valve;
a mounting post formed on and protruding from the closed end of the sealing valve and having:
a diameter;
a free end; and
a limiting board formed on the free end of the mounting post opposite to the closed end of the sealing valve and having a diameter larger than the diameter of the mounting post;
at least one air inlet formed radially through the external surface of the sealing valve near the closed end and selectively communicating with the air inlet chamber of the body or the air outlet chamber of the positioning mount;
a sealing ring mounted around the closed end of the sealing valve and selectively abutting against the at least one sealing element of the positioning mount to enable the air inlet chamber of the body to discommunicate from the air outlet chamber of the positioning mount; and
a ring anti-drop cover movably mounted around the mounting post between the limiting board and the closed end and having:
a closed end facing the connecting end of the body;
an open end mounted around the closed end of the sealing valve and selectively abutting against the sealing ring and the at least one sealing element;
a mounting hole formed through the closed end of the ring anti-drop cover and mounted around the mounting post; and
wherein the returning spring is mounted around the sealing valve and the other end of the returning spring abuts the external surface of the sealing valve near the open end; and
an outer sleeve slidably mounted around the body and the positioning mount and having:
a mounting end mounted around the body near the linking end;
a pushing end mounted around the positioning mount near the inserting end;
an internal surface;

a spring recess formed in the internal surface of the outer sleeve at the mounting end and mounted around the body and the positioning mount;

a holding recess formed in the internal surface of the outer sleeve at the pushing end and holding the balls of the positioning mount inside to keep the outer sleeve from escaping from the positioning mount; and a pressing spring mounted around the positioning mount in the spring recess and abutting the linking end of the body to make the balls held between the holding recess, the ball holes and the external surface of the sealing valve at the open end.

2. The quick release connector as claimed in claim 1, wherein the ring anti-drop cover has multiple slots formed through the closed end of the ring anti-drop cover and communicating with the mounting hole to enable the ring anti-drop cover to elastically deform to pass through the limiting board and to be mounted around the mounting post between the limiting board and the closed end of the sealing valve.

3. The quick release connector as claimed in claim 2, wherein
the sealing valve has a mounting recess formed around the external surface of the sealing valve near the closed end; and
the sealing ring is mounted in the mounting recess.

4. The quick release connector as claimed in claim 3, wherein
the body has a holding recess formed in the body between the air inlet chamber and the linking end of the body; and
the at least one sealing element is mounted in the holding recess of the body.

5. The quick release connector as claimed in claim 4, wherein the body has an outer thread formed on the external surface of the body near the connecting end.

6. The quick release connector as claimed in claim 5, wherein
the body has an inner thread formed on the internal surface of the body near the linking end; and
the positioning mount has an outer thread formed on the external surface of the positioning mount near the fixing end to be securely screwed with the inner thread of the body to connect the positioning mount with the body.

7. The quick release connector as claimed in claim 5, wherein the positioning mount has multiple releasing holes formed through the external surface of the positioning mount at intervals between the fixing end and the ball holes and communicating with the air outlet chamber.

8. The quick release connector as claimed in claim 1, wherein
the sealing valve has a mounting recess formed around the external surface of the sealing valve near the closed end; and
the sealing ring is mounted in the mounting recess.

9. The quick release connector as claimed in claim 1, wherein
the body has a holding recess formed in the body between the air inlet chamber and the linking end of the body; and
the at least one sealing element is mounted in the holding recess of the body.

10. The quick release connector as claimed in claim 1, wherein the body has an outer thread formed on the external surface of the body near the connecting end.

11. The quick release connector as claimed in claim 1, wherein
the body has an inner thread formed on the internal surface of the body near the linking end; and
the positioning mount has an outer thread formed on the external surface of the positioning mount near the fixing end to be securely screwed with the inner thread of the body to connect the positioning mount with the body.

12. The quick release connector as claimed in claim 1, wherein the positioning mount has multiple releasing holes formed through the external surface of the positioning mount at intervals between the fixing end and the ball holes and communicating with the air outlet chamber.

* * * * *